(12) United States Patent
Matthews et al.

(10) Patent No.: US 9,246,810 B2
(45) Date of Patent: Jan. 26, 2016

(54) HASH-BASED LOAD BALANCING WITH PER-HOP SEEDING (75) Inventors: Brad Matthews, San Jose, CA (US); Puneet Agarwal, Cupertino, CA (US)

(73) Assignee: BROADCOM CORPORATION, Irvine, CA (US)

( * ) Notice: Subject to any disclaimer, the term of this patent is extended or adjusted under 35 U.S.C. 154(b) by 249 days.

(21) Appl. No.: 13/418,283

(22) Filed: Mar. 12, 2012

(65) Prior Publication Data

US 2012/0230225 A1 Sep. 13, 2012

Related U.S. Application Data

(60) Provisional application No. 61/451,928, filed on Mar. 11, 2011.

(51) Int. Cl.
*H04L 12/743* (2013.01)
*H04L 12/803* (2013.01)

(52) U.S. Cl.
CPC .......... *H04L 45/7453* (2013.01); *H04L 47/125* (2013.01)

(58) Field of Classification Search
CPC .......................... H04L 45/7453; H04L 47/125
See application file for complete search history.

(56) References Cited

U.S. PATENT DOCUMENTS

| 7,500,264 | B1 * | 3/2009 | Leavy et al. | 726/13 |
|---|---|---|---|---|
| 8,244,909 | B1 * | 8/2012 | Hanson et al. | 709/238 |
| 2003/0223424 | A1 * | 12/2003 | Anderson et al. | 370/392 |
| 2004/0230696 | A1 * | 11/2004 | Barach et al. | 709/238 |
| 2006/0221930 | A1 * | 10/2006 | Sweeney et al. | 370/351 |
| 2008/0037544 | A1 * | 2/2008 | Yano et al. | 370/392 |
| 2008/0172560 | A1 * | 7/2008 | Hughes et al. | 713/176 |
| 2008/0281892 | A1 * | 11/2008 | Hemming | 708/252 |
| 2010/0014442 | A1 * | 1/2010 | Ashwood-Smith | 370/255 |
| 2012/0134266 | A1 * | 5/2012 | Roitshtein et al. | 370/230 |
| 2012/0136846 | A1 * | 5/2012 | Song et al. | 707/698 |
| 2012/0163389 | A1 * | 6/2012 | Zhang et al. | 370/400 |

* cited by examiner

*Primary Examiner* — Andrew Lai
*Assistant Examiner* — M Mostazir Rahman
(74) *Attorney, Agent, or Firm* — Sterne, Kessler, Goldstein & Fox PLLC (57) ABSTRACT

Methods and apparatus for improving hash-based load balancing with per-hop seeding are disclosed. The methods and apparatus described herein provide a set of techniques that enable nodes to perform differing mathematical transformations when selecting a destination link. The techniques include manipulation of seeds, hash configuration mode randomization at a per node basis, per node/microflow basis or per microflow basis, seed index generation, and member selection. A node can utilize any, or all, of the techniques presented in this disclosure simultaneously to improve traffic distribution and avoid path starvation with a degree of determinism.

16 Claims, 7 Drawing Sheets

| | 400 | 404<br>Packet<br>Field<br>Selection | 406<br>Seed<br>Manipulation | 408<br>Seed<br>Selection | Member 410<br>Selection |
|---|---|---|---|---|---|
| 401 | mode 0 | | | | |
| 401 | mode 1 | | | | |
| 401 | mode 2 | | | | |
| 401 | mode 3 | | | | |
| 401 | mode 4 | | | | |
| | . . . | . . . | . . . | | |
| 401 | mode N | | | | |

HASH-BASED LOAD BALANCING WITH PER-HOP SEEDING

CROSS REFERENCE TO RELATED CASES

This application claims the benefit of U.S. Provisional Patent Application No. 61/451,928, filed Mar. 11, 2011 which is incorporated herein by reference in its entirety.

FIELD OF THE INVENTION

This application relates generally to improving load balancing in data networks.

BACKGROUND

In large networks having multiple interconnected devices, traffic between source and destination devices typically traverses multiple hops. In these networks, devices that process and communicate data traffic often implement multiple equal cost paths across which data traffic may be communicated between a source device and a destination device. In certain applications, multiple communications links between two devices in a network may be grouped together (e.g., as a logical trunk or an aggregation group). The data communication links of an aggregation group (referred to as "members") may be physical links or alternatively virtual (or logical) links.

Aggregation groups may be implemented in a number of fashions. For example, an aggregation group may be implemented using Layer-3 (L3) Equal Cost Multi-Path (ECMP) techniques. Alternatively, an aggregation group may be implemented as a link aggregation group (LAG) in accordance with the IEEE 802.3ad standard. In another embodiment, an aggregation group may be implemented as a Hi-Gig trunk. As would be appreciated by persons of skill in the art, other techniques for implementing an aggregation group may be used.

In applications using multiple paths between devices, traffic distribution across members of the aggregate group must be as even as possible to maximize throughput. Network devices (nodes) may use load balancing techniques to achieve distribution of data traffic across the links of an aggregation group. A key requirement of load balancing for aggregates is that packet order must be preserved for all packets in a flow. Additionally, the techniques used must be deterministic so that packet flow through the network can be traced.

Hash-based load balancing is a common approach used in modern packet switches to distribute flows to members of an aggregate group. To perform such hash-based load balancing across a set of aggregates, a common approach is to hash a set of packet fields to resolve which among a set of possible route choices to select (e.g., which member of an aggregate). At every hop in the network, each node may have more than one possible next-hop/link that will lead to the same destination.

In a network or network device, each node would select a next-hop/link based on a hash of a set of packet fields which do not change for the duration of a flow. A flow may be defined by a number of different parameters, such as source and destination addresses (e.g., IP addresses or MAC addresses), TCP flow parameters, or any set of parameters that are common to a given set of data traffic. Using such an approach, packets within a flow, or set of flows that produce the same hash value, will follow the same path at every hop. Since binding of flows to the next hop/link is fixed, all packets will traverse a path in order and packet sequence is guaranteed. However, this approach leads to poor distribution of multiple flows to aggregate members and causes starvation of nodes, particularly in large multi-hop, multi-path networks (e.g., certain nodes in a multi-hop network may not receive any data traffic), especially as one moves further away from the node (called root node) at which the traffic entered the network.

What is therefore needed are techniques for providing randomization and improved distribution to aggregate members.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
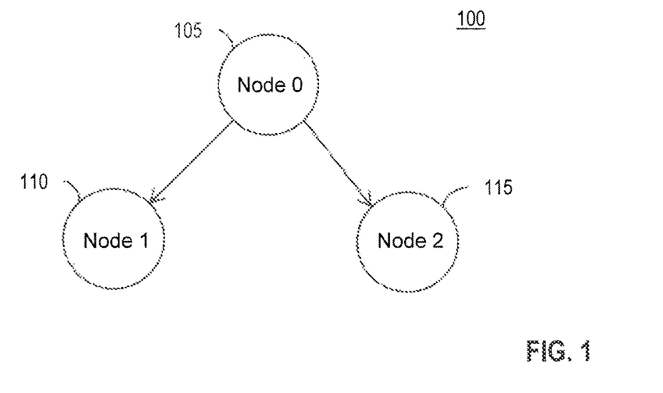
FIG. 1 illustrates a block diagram of a single-hop of a multi-hop network in accordance with an embodiment of the invention.

FIG. 1 is block diagram illustrating a single-hop of a multi-path network 100 (network 100), according to embodiments of the present invention. For purposes of this disclosure, a node may be viewed as any level of granularity in a data network. For example, a node could be an incoming data port, a combination of the incoming data port and an aggregation group, a network device, a packet switch, or may be some other level of granularity. The network 100 includes three nodes, Node 0 105, Node 1 110 and Node 2 115. In the network 100, data traffic (e.g., data packets) may enter the network 100 via Node 0 105 (referred to as the "root" node). Depending on the data traffic, Node 0 105, after receiving the data traffic, may then select a next-hop/link for the data traffic. In this example, the Node 0 105 may decide to send certain data packets to the Node 1 110 and send other data packets to the Node 2 115. These data packets may include data information, voice information, video information or any other type of information.

In a multi-path network, the Node 1 110 and the Node 2 115 may be connected to other nodes in such a fashion that data traffic sent to either node can arrive at the same destination. In such approaches, the process of binding a flow to a next-hop/link may begin by extracting a subset of static fields in a packet header (e.g., Source IP, Destination IP, etc.) to form a hash key. A hash key may map to multiple flows. However, all packets in a flow will have the same hash key. If the hash key were to change for packets within a flow, a fixed binding of a flow to a next-hop/link would not be guaranteed and re-ordering of packets in that flow may occur at one or more nodes. Packet re-ordering could lead to degraded performance for some communication protocols (e.g., TCP).

The hash key then serves as an input to a hash function, commonly a

CRC16 variant or CRC32 variant, which produces, respectively, a 16-bit or 32-bit hash value. In some implementations, a CRCXX hash function is used. As would be appreciated by a person of ordinary skill in the art, other switches may use different hash functions (e.g., Pearson's hash). Typically, only a subset of the hash value bits is used by a given application (e.g., Trunking, LAGs, and ECMP), herein, collectively, aggregation group(s)). Unused bits of the hash value are masked out and only the masked hash value is used to bind a flow to one of the N aggregate members, where N is the number of links that belong to a given aggregation group.

The list of N aggregate members may be maintained in a destination mapping table for a given aggregate. Each table entry contains forwarding information indicating a link (next hop). The index into the destination mapping table may be calculated as the remainder of the masked hash value modulo N (the number of aggregate group members), such as the one shown below by Equation 1.

$$\text{destination table index} = \text{masked\_hash\_value} \bmod N \quad (1)$$

Using the destination table index, the node may determine the next-hop/link destination (aggregate member) for each packet. This process binds a flow or set of flows to a single aggregate member using a mathematical transformation that will always select the same aggregate member for a given hash key at each node.

As discussed above, network 100 is a single-hop network (depth=1 with two layers) that may be part of a larger multi-hop, multi-path network that performs forwarding for flows going to the same or different destinations. As previously indicated, all data traffic that is communicated in the network 100 traffic may enter the network 100 via a root node. For purposes of this example, it will be assumed that all flows can reach any destination of a larger network of which the network 100 is a part of using any leaf of an N-ary tree rooted at the Node 0 105. in such a network, packets originating at the root node will pick between 1 to N aggregate members from which the packet should depart using a hashing function. If each flow has a unique hash key and the hash function distributes hash-values equally over the hash values 16-bit space, then flows arriving to the Node 0 105 will be distributed evenly to each of its two child nodes, Node 1 110 and Node 2 115.

If the depth of the tree is one (as shown in FIG. 1), flows are evenly distributed and there are no starved paths (paths that receive no traffic). Therefore, in this example, neither Node 1 110 or Node 2 115 will receive a disproportionate number of flows and, accordingly, there are no starved leaf nodes (i.e, leaf nodes that receive no traffic).

Figure 2:
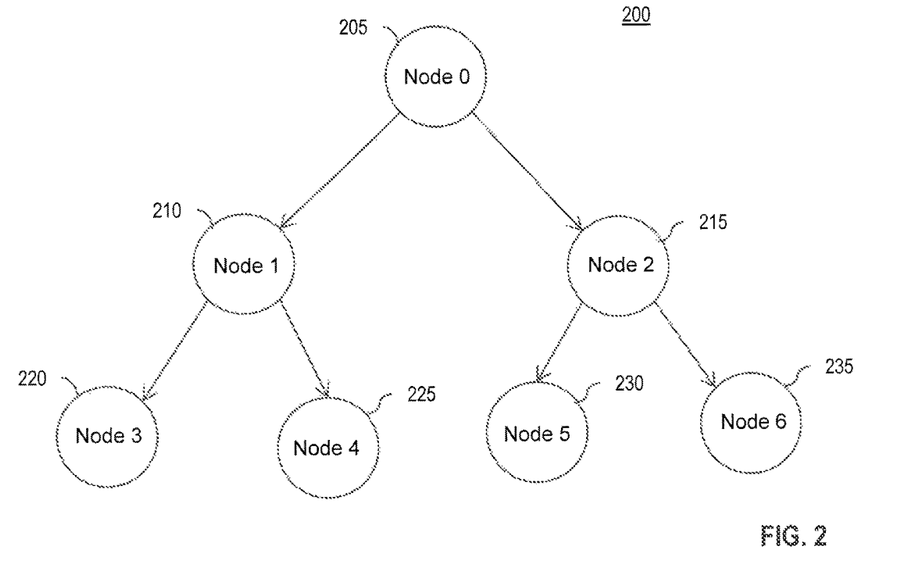
FIG. 2 illustrates a block diagram of two hops of a multi-path network in accordance with an embodiment of the invention.

Extending the depth of the tree another level, both node 1 and node 2 have 2 children each. This embodiment is depicted in FIG. 2. FIG. 2 is a. block diagram illustrating two hops of a multi-path network. 200 in accordance with an example embodiment. As with network 100 discussed above, the network 200 may be part of a larger multi-hop, multi-path network. In network 100, all data traffic that is communicated in the network 200 may enter the network 200 via a single node (called root node), in this case, the Node 0 205.

In the network 200, if the same approach is used to determine hash keys and the same hash function is used for all nodes, an issue arises at the second layer of the network 200 as flows are received at Node 1 210 and Node 2 215. In this situation, each packet arriving at Node 1 210 will yield the same hash key as Node 0 205, when operating on the same subset of packet fields (which is a common approach). Given the same hash function (e.g., a CRC16 hash function) and number of children, the result of the hashing process at Node 0 205 will be replicated at Node 1 210. Consequently, all flows that arrive at Node 1 210 will be sent to Node 3 220 as these are the same flows that went "left" at Node 0 205. Because, in this arrangement, the same mathematical transformation (hash function) is performed on the same inputs (hash keys) at each node in the network, the next-hop/link selected by the hash algorithm remains unchanged at each hop. Thus, the next-hop/link selection between two or more nodes in the flow path (e.g., Node 0 205 and Node 1 210) is highly correlated, which may lead to significant imbalance among nodes.

For a binary tree with a depth of 2 hops (three layers), the consequence of this approach is that all flows that went "left" at the Node 0 205 and arrived at the Node 1 210 (e.g., all flows arriving at the Node 1 210 from Node 0 205), will again go "left" at Node 1 210 and arrive at Node 3 220. As a result, Node 4 225 will not receive any data traffic, thus leaving it starved. Similarly, all traffic sent to the Node 2 215 will be propagated "right" to the Node 6 235, thereby starving the Node 5 230. As the depth of such a network increases, this problem is exacerbated given that the number of leaf nodes increases (e.g., exponentially), but only two nodes at each level will receive data traffic.

As discussed in further detail below, the following techniques randomize flow distribution at each node in a multi-hop network. This is achieved by providing a set of techniques that enable each node to perform differing mathematical transformations when selecting a destination link. Performing different transformations at each node reduces the correlation in next-hop/link selection among nodes. This minimizes traffic imbalances at each node and prevents starvation of paths. The techniques used to achieve these performance gains include seed expansion/generation, seed manipulation, hash configuration mode randomization at a per node basis, per node/microflow basis, or per microflow basis, seed index generation, and member selection. Each of these techniques is described in further detail below. A node can utilize any, or all, of the techniques presented in this disclosure simultaneously to improve traffic distribution and avoid path starvation with a degree of determinism.

Figure 3:
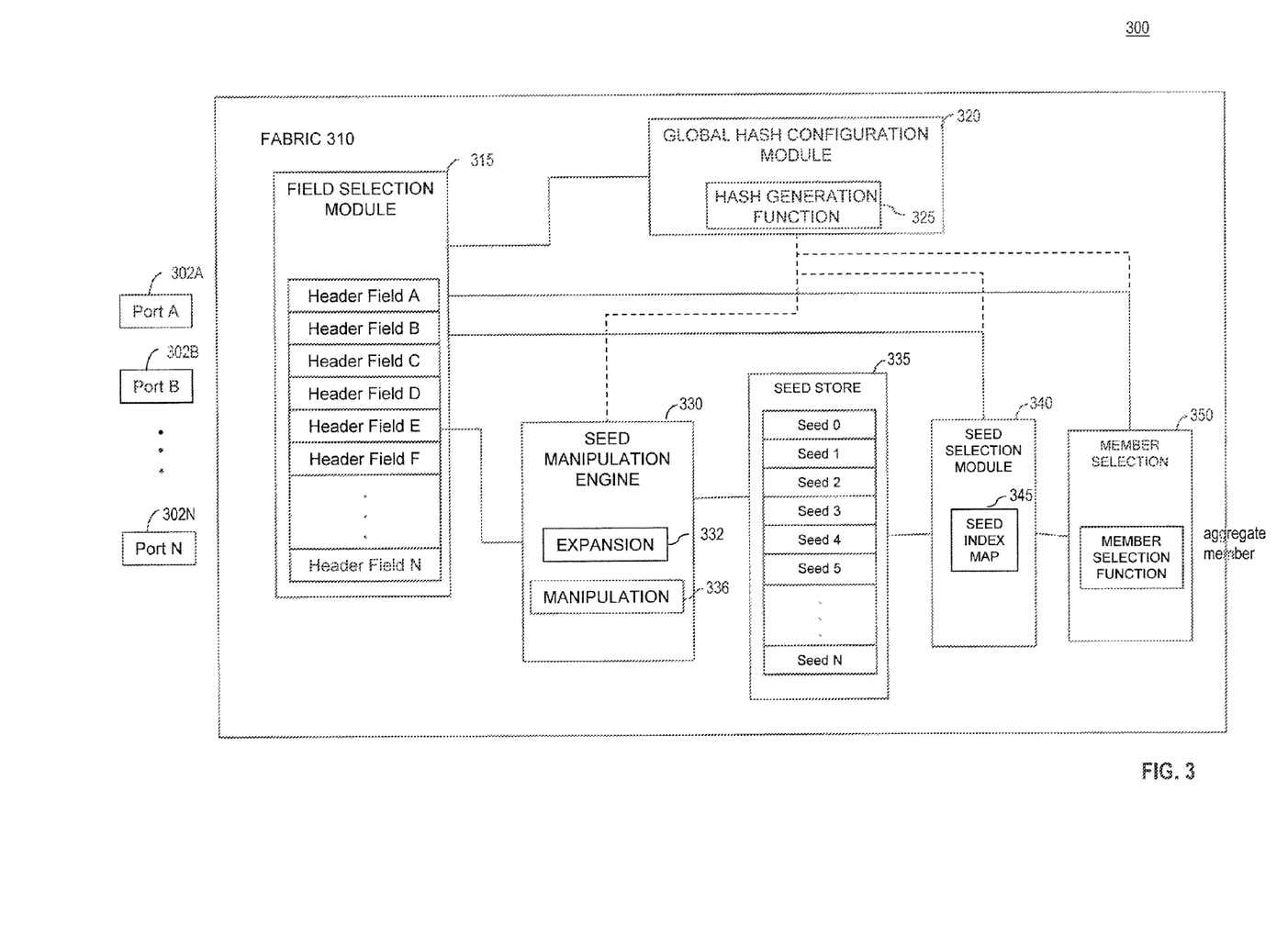
FIG. 3 is a block diagram illustrating a network node, in accordance with an embodiment of the present invention.

FIG. 3 is a block diagram illustrating a network node 300, in accordance with an embodiment of the present invention. Network node 300 may be a network switch, a router, a network interface card, or other appropriate data communication device. Node 300 may be configured to perform one or more of the load balancing techniques described herein.

Node 300 includes a plurality of ports 302A-N (Ports A through N) configured to receive and transmit data packets over a communication link. Node 300 also includes switching fabric 310. Switching fabric 310 is a combination of hardware and software that, for example, switches (routes) incoming data to the next node in the network. In an embodiment, switching fabric 310 includes one or more processors and memory.

Fabric 310 includes one or more modules configured to minimize path imbalances in a configurable and deterministic manner. The modules included in fabric 310 may include packet field selection module 315, global hash configuration module 320, seed manipulation engine 330, memory 335 (referred to as a seed store), seed selection module 340, and member selection module 350.

Global hash configuration module 320 is configured to generate a hash configuration mode to be applied for a received packet. The hash configuration mode may be set on a per node basis (static) or may be set on a per flow or microflow basis (dynamic). The hash configuration mode dictates how one or more of the modules are configured. The hash configuration mode determines the operation(s) performed by these modules.

Per node hash configuration mode is static for the node. In a per node hash configuration mode, the mode is independent of the flow or microflow of a packet. In a dynamic hash configuration mode, the mode is bound to a flow/microflow or set of flows/microflows. A flow/microflow may be identified by a set of select packet fields.

Global hash configuration module 320 may include a mode index generation function 325 configured to generate a mode index when the node is operating in dynamic hash configuration mode. In dynamic hash configuration mode, the node may be specified to have up to N hash configuration modes. Mode index generation function 325 receives a set of select packet fields from packet field selection module 310. The fields are then mapped into the mode number space. For example, a node may have 100,000 active microflows and 100 configuration modes. Each active microflow (or group of microflows) would be mapped into one of the 100 configuration modes.

Figure 4:
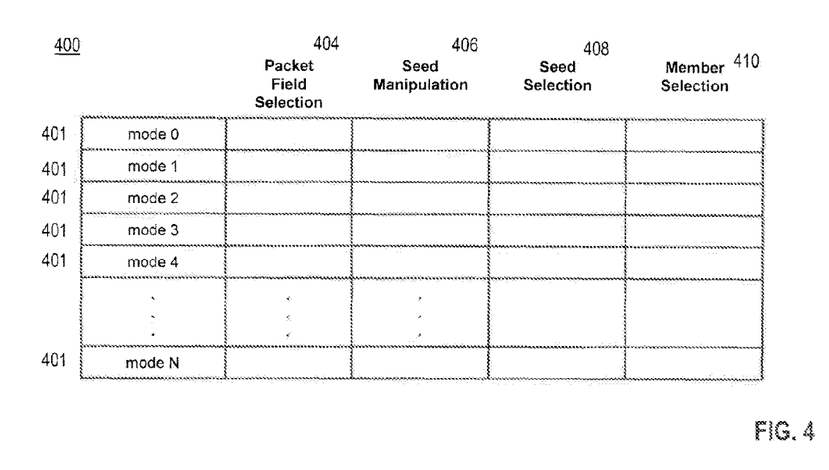
FIG. 4 shows a mode configuration table, according to embodiments of the present invention

The generated mode index acts as an index into a mode configuration table. Each mode configuration table entry contains information on how the mode should be configured for a given flow or microflow. FIG. 4 shows a mode configuration table 400 according to embodiments of the present invention. In this example, each mode may have a separate row in the table. A mode is associated with one or more module configuration columns. Although depicted and described as a table, a person of skill in the art would recognize that other formats or techniques may be used define the operations of the modules associated with a configuration mode.

The module configuration specifies the operation or operations to be performed by the specific module. A hash configuration mode 401 may be associated with a packet field selection configuration 404, a seed manipulation configuration 406, a seed selection configuration 408, and/or a member selection configuration 410. Using the mode index, the global hash configuration module 320 determines how to configure each module for the received packet.

The benefits provided by such a dynamic hash configuration are more apparent when implemented in a multi-hop multi-path network, because the hash configuration at each node can be unique to a per-flow or per-set-of-flows. This reduces correlation in the next-hop/link selection process between nodes which, in turn, reduces next-hop/link imbalance and starvation/overutilization of links and nodes.

Packet field selection data structure 315 is configured to select a set of packet fields from a received packet to be used by other modules to perform load balancing techniques described herein. For example, as illustrated in FIG. 3, the global hash configuration module 320, the seed manipulation engine 330, the seed selection module 340, and the member selection module 350 each receive a set of select packet fields. The set of packet fields to be selected for a particular module are determined by the mode associated with the packet. The set of select packet fields may be the same for each module or may differ for one or more of the modules.

Seed manipulation engine 330 is configured to provide a set of manipulated seed values to seed store 335. In an embodiment, seed manipulation engine 330 receives one or more seed values. The one or more seed values may be provided by a user or administrator of the node. Alternatively, the one or more seed values may be generated by a module external to the seed manipulation engine 330. In another embodiment, seed manipulation engine 330 receives a single seed initialization value. In this embodiment, seed manipulation engine 330 generates a set of seed values from the seed initialization value. The seed initialization value can be provided by a user or administrator of the node. Alternatively, the seed initialization value may be derived from one or more selected packet fields.

Seed manipulation engine 330 includes a seed expansion module 332 and a seed transformation module 336. Seed expansion module 332 is configured to expand an initial set of seed values to a final set of seed values. Seed expansion module 332 receives up to N seed values as input. As described above, the N seed values may be received by seed manipulation engine 330 or may be generated within seed manipulation engine 330. The seed expansion module 332 then performs an expansion operation such that the output is k*N expanded seed values where k represents a multiplier value. When k=1, no expansion is performed by seed expansion module 332.

Figure 5:
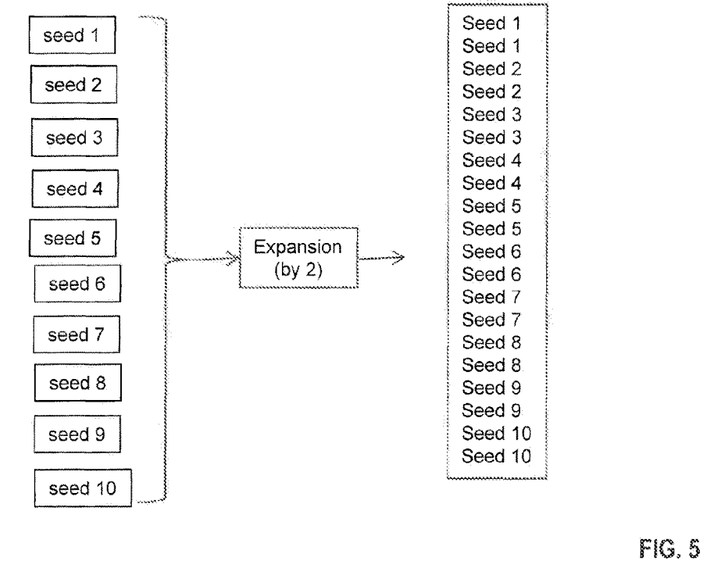
FIG. 5 depicts example of an example of a k=2 expansion of seed values, according to embodiments of the present invention.

For example, the seed expansion module 332 may take a seed value and expand it to k parallel seed values. FIG. 5 depicts example of an example of a k=2 expansion of seed values, according to embodiments of the present invention. In the example of FIG. 5, the seed expansion module 332 receives 10 input seed values. Because k=2, the seed expansion module 332 outputs 20 expanded seed values.

Seed transformation module 336 is configured to transform the set of expanded seed values into a set of manipulated seed values. Seed transformation module 336 receives the set of expanded seed values from seed expansion module 332. During transformation, seed transformation module 336 may utilize an arbitrary seed manipulation function to perform bitwise operations on the set of expanded seed values. In an embodiment, the bitwise operations include, for example, an XOR and/or a CRC. The seed transformation module 336 may use select packet fields in addition to seed values when performing the bitwise operations. As a result of the seed expansion and transformation, seed manipulation engine 330 creates a set of unique seeds on a per flow basis. The set of seeds (also referred to as manipulated seeds) is then stored in memory 335 (also referred to as the seed store).

Seed selection module 340 is configured to select a single seed value from seed store 335 and provide the selected seed value to member selection module 350 using a seed index map 345. The seed index map may operate in static mode or offset mode. Seed selection module 340 may support one or both seed index map modes.

Figure 6A:
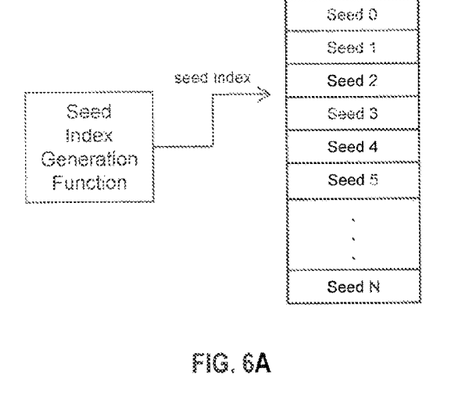
FIG. 6A depicts a static seed index map, according to embodiments of the present invention

In an embodiment, seed selection module 340 includes an arbitrary seed index generation function. When the seed index map is in static mode, select packet fields received from packet field selection module 310 are manipulated by the arbitrary seed index generation function to create a seed index. Exemplary seed index generation functions include, but are not limited to, XOR, CRC, AND, and OR. FIG. 6A depicts a static seed index map, according to embodiments of the present invention.

Figure 6B:
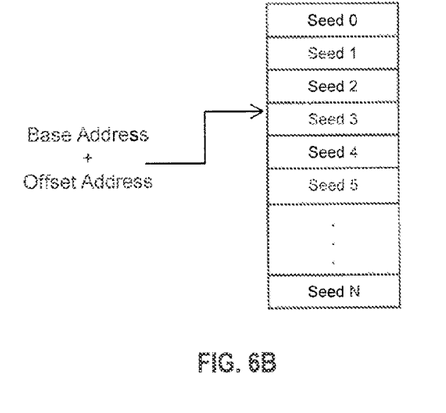
FIG. 6B depicts an offset seed index map, according to embodiments of the present invention.

When seed index map is in offset mode, the seed index is constructed using a seed store base and seed store offset addresses. Multiple seed store base addresses can exist. In an embodiment, a specific seed store base address is identified using a mapping from select packet fields received from packet field selection module 310. In an embodiment, the seed store offset may also be formed using a mapping of select packet fields to a value. The sum of the seed base address and the seed offset results in the seed index. The seed index is then used to select a seed value from the seed store. FIG. 6B depicts an offset seed index map, according to embodiments of the present invention.

Figure 7:
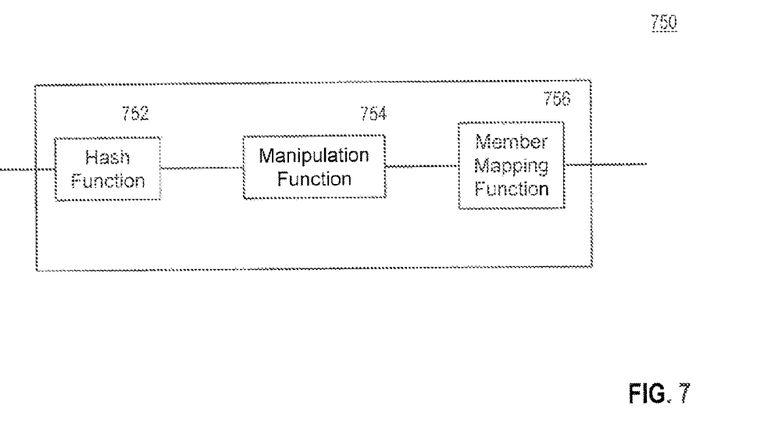
FIG. 7 depicts an exemplary member selection module, according to embodiments of the present invention.

Member selection module 350 is configured to select the next-hop/link using an arbitrary member selection function. FIG. 7 depicts an exemplary member selection module 750, according to embodiments of the present invention. Member selection module 750 receives as input the selected seed value from seed selection module 340 and/or select packet fields from packet field selection module 315. Member selection module 750 includes a hash function 752, an optional manipulation function 754, and a member mapping function 756.

Hash function 752 receives as input a hash key. In an embodiment, the selected seed value from seed selection module 340 is used as the hash key. In an alternate embodiment, member selection function constructs the hash key from one or more select packet fields and the selected seed value.

Figure 8A:
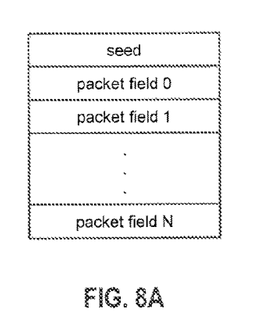
FIGS. 8A-C depict exemplary hash keys, according to embodiments of the present invention.
Figure 8B:
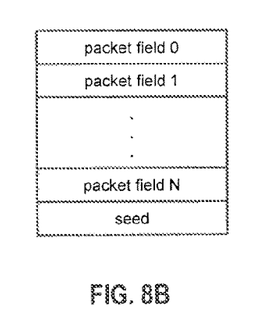
Figure 8C:
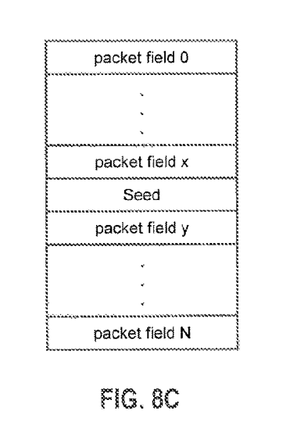

In an embodiment, the hash key is constructed by prepending, appending or interleaving the selected seed with the selected packet fields. FIGS. 8A-C depict exemplary hash keys, according to embodiments of the present invention. In FIG. 8A, the selected seed is prepended to the selected packet fields to form the hash key. In FIG. 8B, the selected seed is appended to the selected packet fields to form the hash key. In FIG. 8C, the selected seed is interleaved with the selected packet fields to form the hash key.

Figure 9:
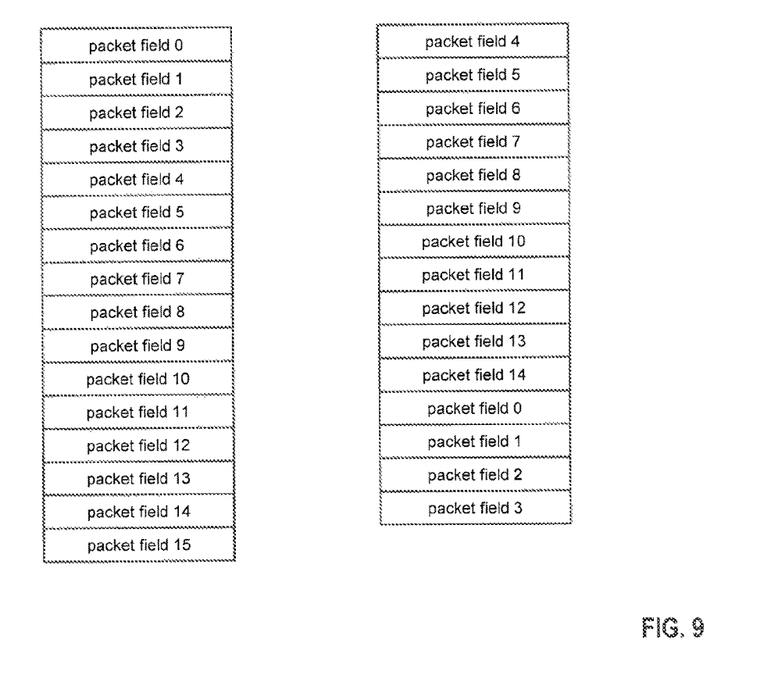
FIG. 9 depicts a hash key having 16 select packet fields, according to embodiments of the present invention.

Additionally, the order of the packet fields can be modified by rotating the order of the select packet fields in a predetermined manner. For example, FIG. 9 depicts a hash key having 16 select packet fields, according to embodiments of the present invention. In one embodiment, the select packet fields are used in the same order (0 to 16). In another embodiment, the select packet fields are rotated by 4. The revised order of the packet fields in the hash key is then (4 to 16, 0 to 3).

In a further alternative embodiment, the member selection function module may utilize a bitwise operation on the selected seed value and the packet fields to construct the hash key. Exemplary bitwise operations include, but are not limited to, XOR, AND, OR, and inverting (using a logical NOT operation).

The hash key is used as input to a hash function. The hash function may one of a CRC16 hash function, a CRC32 hash function, a CRCXX hash function, a Pearson's hash function or an XOR hash function. Of course, a given node may have other hash functions to select from and may implement a number of other hash functions instead of the examples listed above.

The output of the hash function is a hash value. In an embodiment, the hash value is used by mapping function 756 for next-hop/link selection, as described in farther detail below. In an alternate embodiment, the hash value is provided as input to a hash manipulation function 754. The hash manipulation function 754 is configured to perform an operation (e.g., a bitwise operation such as shift, AND, XOR, etc.) on the received hash value to generate a modified hash value.

Member mapping function 756 is configured to perform the next-hop/link selection for the associated data packet. Member mapping function 756 receives as input the hash value (or modified hash value). The member mapping function may select the next hop/link (member) by computing an index into a destination mapping table and then indexing the destination mapping table with the computed index. In an example embodiment, a destination mapping index may be the remainder of the hash value (or modified hash value) modulo N, where N is the number of members in a given aggregation group.

Figure 10:
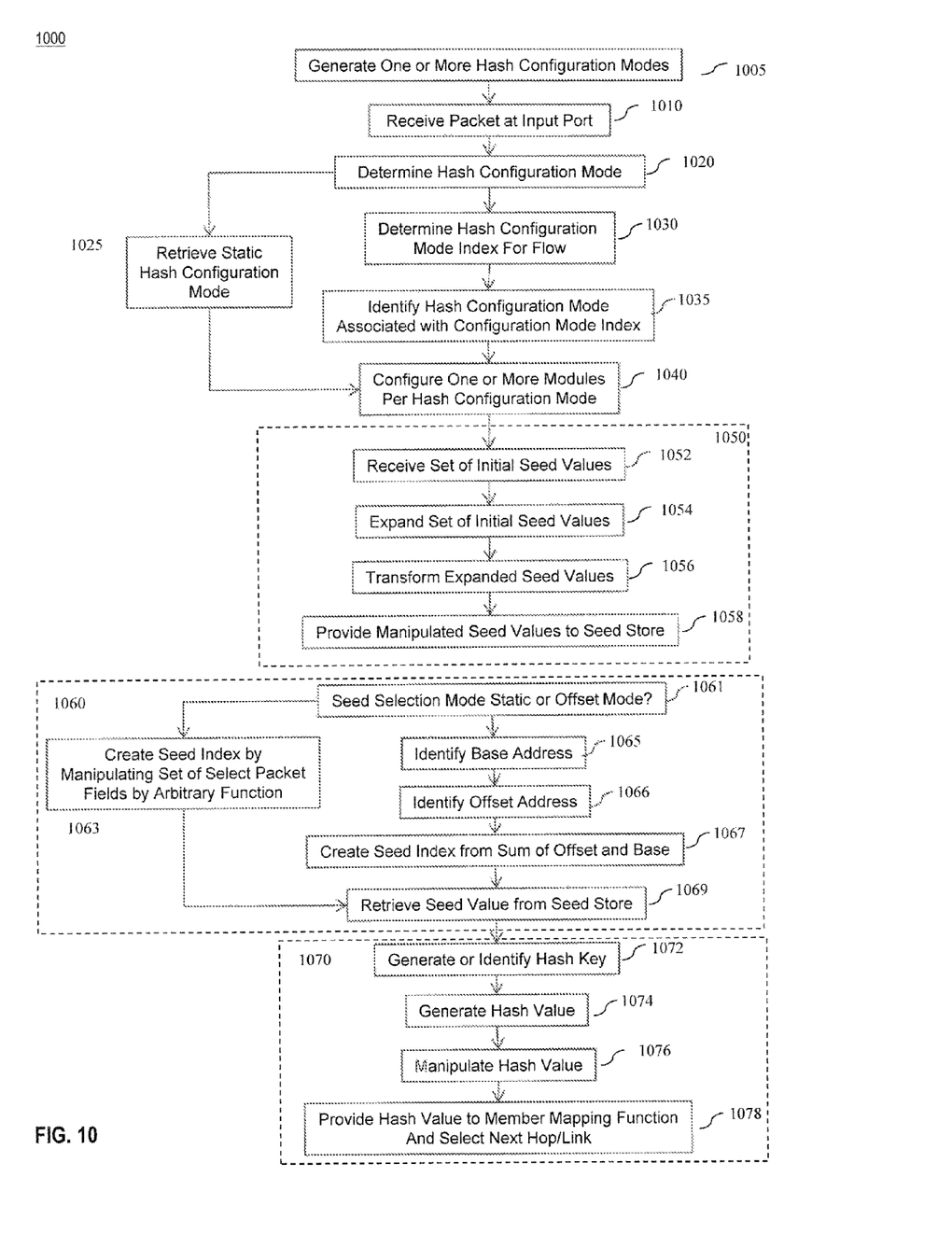
FIG. 10 is a flowchart illustrating a method for hash-based load balancing with per-hop seeding, according to an embodiment of the present invention.

FIG. 10 is a flowchart illustrating a method 1000 for hash-based load balancing with per-hop seeding, according to an embodiment of the present invention. Method 1000 is described with continued reference to the embodiments of FIGS. 3-9. However, method 1000 is not limited to those embodiments.

In step 1005, one or more hash configuration modes are generated for the node. As described above, a node may include a static (per node) hash configuration mode and/or one or more per flow (or group of flows) configuration modes. The hash configuration mode determines the operation(s) performed by one or more modules of the node including packet field selection, seed manipulation, seed selection, and/or member selection. In dynamic hash configuration mode, the node may be specified to have up to N modes.

In step 1010, a data packet is received by the node. The data packet has a plurality of fields.

In step 1020, a determination of the hash configuration mode to apply to the packet is made. If the hash configuration mode is per node (static), operation proceeds to step 1025. In the hash configuration mode is dynamic, operation proceeds to step 1030.

In step 1025, the static hash configuration mode of the node is retrieved. Operation then proceeds to step 1040.

In step 1030, a hash configuration mode index for the flow (or microflow) is determined. In an embodiment, a set of packet fields is mapped to a mode index (e.g., 0 to N−1) using a mapping function.

In step 1035, the hash configuration mode associated with the hash configuration mode index is identified. In an embodiment, the hash configuration mode associated with the hash configuration mode index is retrieved. Operation then proceeds to step 1040.

In step 1040, one or more modules for the node are configured as specified by the hash configuration mode.

In step 1050, seed manipulation and expansion are performed by seed manipulation engine 330. This step is optional. Step 1050 includes steps 1052-1058.

In step 1052, seed manipulation engine 330 receives a set of initial seed values. In an embodiment, the set of initial seed values is provided by a user or by a module external to seed manipulation engine 330. In an alternate embodiment, the set of initial seed values is generated by seed manipulation engine 330 using a seed initialization value. The seed initialization value may be provided by a user or may be generated from one or more select packet fields provided to the seed manipulation engine by the packet field selection data structure 315.

In step 1054, seed expansion module 332 expands the set of initial seed values by a factor of k to create a set of expanded seed values. For example, each initial seed value may be expanded to k parallel values.

In step 1056, the set of expanded seed values is transformed to generate a set of manipulated seed values. In an embodiment, the transformation applied in this step is a bitwise operation (e.g., shift, XOR, AND, OR, etc.)

In step 1058, the set of manipulated seed values is provided to the seed store.

In step 1060, a single seed value is selected from the seed store and provided to member selection module 350. Step 1060 includes steps 1061 through 1069.

In step 1061, a determination is made whether seed selection index map is operating in static or offset mode. If seed selection index map is operating in static mode, operation proceeds to step 1063. If seed selection index map is operation in offset mode, operation proceeds to step 1065.

In step 1063, the seed index is created by manipulating a set of select packet fields by an arbitrary seed index generation function. Example seed index generation functions that can be utilized include, but are not limited to, XOR, CRC, AND, OR. Operation proceeds to step 1069.

In step 1065, a base address is identified. In an embodiment, a base address is identified using a mapping of select packet fields to a value for base address selection.

In step 1066, an offset is identified. In an embodiment the offset is identified using a mapping of select packet fields to a value for offset selection.

In step 1067, the seed index is created from the sum of the offset and the base.

In step 1069, a seed value associated with the seed index is retrieved from the seed store.

In step 1070, the next-hop/link is selected. Step 1070 includes steps 1072 to 1078.

In step 1072, a hash key is generated or identified. In an embodiment, the selected seed value is used as the hash key. In an alternate embodiment, the hash key is generated by prepending, appending, or interleaving the selected seed value with a set of select packet fields. The hash key can be further manipulated by rotating the position of the select packet fields in the hash key as described above. Additionally, a bitwise function may be used on the selected seed value and set packet fields.

In step 1074, a hash value is generated. In an embodiment, the hash value is generated using a hash function. In an alternate embodiment, the hash value may be produced using a look-up table.

In step 1076, the generated hash value is further manipulated. This step is optional. When present, the manipulation may be a bitwise operation such as shift, AND, XOR, etc.

In step 1078, hash value output of step 1074 or the modified hash value output of step 1076 is provided as input to a member mapping function. The member mapping function selects the next-hop/link to which the packet should be forwarded. The member mapping function can be any arbitrary function that maps the hash input value to an aggregate member. In an embodiment, the member mapping function is a modulo function.

All or a portion of the methods described above may be performed by one or more processors executing a computer program product. Additionally, or alternatively, one or all components of the above methods may be performed by special purpose logic circuitry such as a field programmable gate array (FPGA) or an application specific integrated circuit (ASIC).

Figure 11:
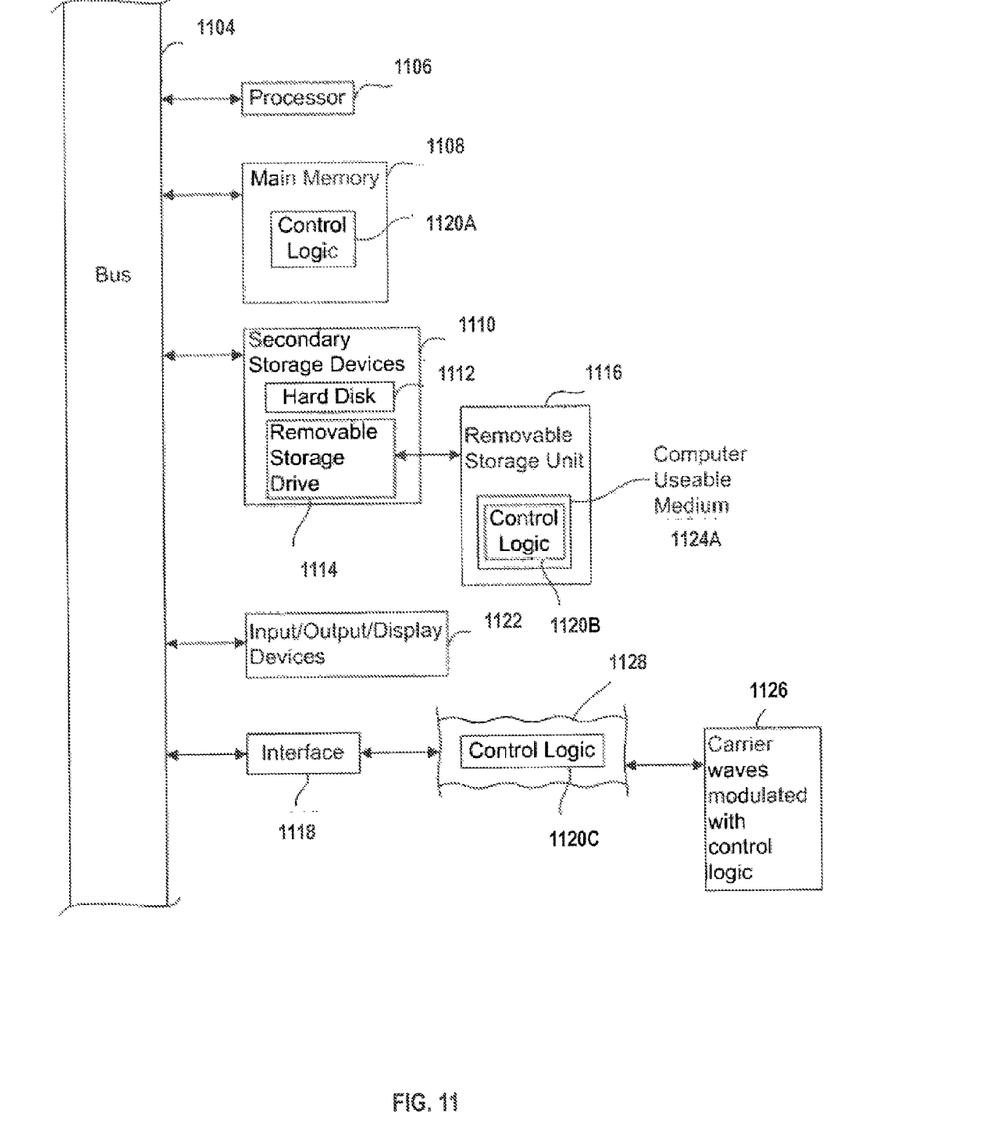
FIG. 11 illustrates an example computer system in which embodiments of the present invention, or portions thereof, can be implemented as computer-readable code.

FIG. 11 illustrates an example computer system 1100 in which embodiments of the present invention, or portions thereof, can be implemented as computer-readable code. For example, the method illustrated by flowchart 400 can be implemented in system 1100. However, after reading this description, it will become apparent to a person skilled in the relevant art how to implement embodiments using other computer systems and/or computer architectures.

Computer system 1100 includes one or more processors, such as processor 1106. Processor 1106 can be a special purpose or a general purpose processor. Processor 1106 is connected to a communication infrastructure 1104 (for example, a bus or network).

Computer system 1100 also includes a main memory 1108 (e.g., random access memory (RAM)) and secondary storage devices 1110. Secondary storage 1110 may include, for example, a hard disk drive 1112, a removable storage drive 1114, and/or a memory stick. Removable storage drive 1114 may comprise a floppy disk drive, a magnetic tape drive, an optical disk drive, a flash memory, or the like. Removable storage drive 1114 reads from and/or writes to a removable storage unit 1116 in a well-known manner. Removable storage unit 1116 may comprise a floppy disk, magnetic tape, optical disk, etc. which is read by and written to by removable storage drive 1114. As will be appreciated by persons skilled in the relevant art(s), removable storage unit 516 includes a computer usable storage medium 1124A having stored therein computer software and/or logic 1120B.

Computer system 1100 may also include a communications interface 1118. Communications interface 1118 allows software and data to be transferred between computer system 1100 and external devices. Communications interface 1118 may include a modem, a network interface (such as an Ethernet card), a communications port, a PCMCIA slot and card, or the like. Software and data transferred via communications interface 1118 are in the form of signals which may be electronic, electromagnetic, optical, or other signals capable of being received by communications interface 1118. These signals are provided to communications interface 1118 via a communications path 1128. Communications path 1128 carries signals and may be implemented using wire or cable, fiber optics, a phone line, a cellular phone link, an RF link or other communications channels.

In this document, the terms "computer usable medium" and "computer readable medium" are used to generally refer to media such as removable storage unit 1116 and a hard disk installed in hard disk drive 1112. Computer usable medium can also refer to memories, such as main memory 1108 and secondary storage devices 1110, which can be memory semiconductors (e.g. DRAMs, etc.).

Computer programs (also called computer control logic) are stored in main memory 1108 and/or secondary storage devices 1110. Computer programs may also be received via communications interface 1118. Such computer programs, when executed, enable computer system 1100 to implement embodiments of the present invention as discussed herein. In particular, the computer programs, when executed, enable processor 1106 to implement the processes of the present invention. Where embodiments are implemented using software, the software may be stored in a computer program product and loaded into computer system 1000 using removable storage drive 1114, interface 1118, or hard drive 1112.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present invention should not be limited by any of the above-described exemplary embodiments, but should be defined only in accordance with the following claims and their equivalents.

What is claimed is:

1. A method for processing a data packet at a network node, comprising:
    receiving, at the network node, the data packet, wherein the data packet has a plurality of packet fields;
    generating a plurality of seed values, comprising:
        receiving a set of initial seed values,
        expanding the set of initial seed values by a predetermined expansion value to generate a set of expanded seed values, and
        applying a transformation to the set of expanded seed values to generate the plurality of seed values;
    selecting a seed value from the plurality of seed values comprising:
        generating a seed index by identifying a base address using a second set of packet fields, identifying an offset, and combining the base address and the offset to generate the seed index, and
        selecting the seed value from the plurality of seed values using the seed index;
    generating a hash key using the selected seed value and a first set of packet fields from the plurality of packet fields;
    generating a hash value from the hash key; and
    selecting a path for the data packet based on the hash value.

2. The method of claim 1, further comprising:
    determining a configuration mode to apply at the network node.

3. The method of claim 1, further comprising:
    determining a configuration mode to apply during processing of the data packet based on a second set of packet fields from the plurality of packet fields.

4. The method of claim 3, wherein determining the configuration module comprises:
    determining an index to a hash configuration mode table based on the second set of packet fields; and
    selecting the hash configuration mode using the index, wherein the hash configuration mode identifies one or more operations to perform during processing of the data packet.

5. The method of claim 1, further comprising:
    performing, at the network node, an initialization for the network node, the initialization including:
    identifying a plurality of hash configuration modes for the network node, and selecting, for a hash configuration mode in the plurality of hash configuration modes, one or more operations to perform during processing the data packet.

6. The method of claim 1, wherein the set of initial seed values includes a seed initialization value.

7. The method of claim 6, wherein generating the plurality of seed values further comprises:
    generating a second set of seed values using the seed initialization value, and
    expanding the second set of seed values by the predetermined expansion value to generate the set of expanded seed values.

8. The method of claim 1, wherein applying the transformation to the set of expanded seed values includes:
    applying a bitwise operation using a second set of packet fields to generate the plurality of seed values.

9. The method of claim 1, wherein generating the hash key comprises:
    prepending the selected seed value to the first set of packet fields.

10. The method of claim 1, wherein generating the hash key comprises:
    interleaving the selected seed value in the first set of packet fields.

11. The method of claim 1, wherein generating the hash key comprises:
    appending the selected seed value to the first set of packet fields.

12. The method of claim 1, wherein generating the hash value from the hash key comprises:
    generating a first hash value from the hash key using a first arbitrary function; and
    transforming the first hash value to a second hash value using a second arbitrary function.

13. A non-transitory computer program product comprising a non-transitory computer useable medium having computer program logic recorded thereon, the computer control logic when executed by a processor enabling the processor to process packet data according to a method, the method comprising:

receiving, at a network node, a data packet having a plurality of packet fields;
generating a plurality of seed values, comprising:
  receiving a set of initial seed values,
    expanding the set of initial seed values by a predetermined expansion value to generate a set of expanded seed values, and
    applying a transformation to the set of expanded seed values to generate the plurality of seed values;
selecting a seed value from the plurality of seed values comprising:
  generating a seed index by identifying a base address using a second set of packet fields, identifying an offset, and combining the base address and the offset to generate the seed index, and
  selecting the seed value from the plurality of seed values using the seed index;
generating a hash key using the selected seed value and a first set of packet fields from the plurality of packet fields;
generating a hash value from the hash key; and
selecting a path for the data packet based on the hash value.

14. The non-transitory computer program product of claim 13, wherein the method further comprises:
  determining an index to a hash configuration mode table based on a second set of packet fields; and
  selecting a hash configuration mode using the index, wherein the hash configuration mode identifies one or more operations to perform during processing of the data packet.

15. The non-transitory computer program product of claim 13, wherein generating the plurality of seed values further comprises:
  generating a second plurality of seed values using the seed initialization value, and
  expanding the second plurality of seed values by the predetermined expansion value to generate the set of expanded seed values.

16. A network routing device, comprising:
  a memory for storing a plurality of seed values;
  a port configured to receive a data packet having a plurality of packet fields;
  a seed manipulation module configured to receive a set of initial seed values, expand the set of initial seed values by a predetermined expansion value to generate a set of expanded seed values, and apply a transformation to the set of expanded seed values to generate the plurality of seed values;
  a seed selection module configured to identify a base address using a second set of packet fields, identify an offset, and combine the base address and the offset to generate a seed index, and further configured to select a seed value from the plurality of seed values using the seed index; and
  a member selection module configured to generate a hash key using the selected seed value and a first set of packet fields from the plurality of packet fields, generate a hash value from the hash key, and select a path for the data packet based on the hash value.

* * * * *